(12) United States Patent
Hsu

(10) Patent No.: US 7,236,309 B1
(45) Date of Patent: Jun. 26, 2007

(54) BIFOCAL DOUBLE GROUP LENS ASSEMBLY

(75) Inventor: Wen-hung Hsu, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 11/458,703

(22) Filed: Jul. 20, 2006

(51) Int. Cl.
*G02B 15/14* (2006.01)

(52) U.S. Cl. ...................... 359/691; 359/682

(58) Field of Classification Search ................ 359/691, 359/680–682
See application file for complete search history.

(56) References Cited

U.S. PATENT DOCUMENTS 5,552,936 A * 9/1996 Ohno ......................... 359/691

6,025,961 A * 2/2000 Kohno et al. ............... 359/691

* cited by examiner

*Primary Examiner*—Scott J. Sugarman
(74) *Attorney, Agent, or Firm*—Banger Shia

(57) ABSTRACT

A bifocal double group lens assembly, sequentially from the object side, comprises: a stationary first lens group with a negative refractive power, a second lens group with a positive refractive power being moveable along optical axis. The second lens group, at two different positions, can focus appropriately on an infinitely distant object when moving along the optical axis. When the lens assembly is in the wide angle mode, and the object to be shot moves from an infinite distance to a near point, the second lens group will move toward the object side for focusing. When the lens assembly is in the Tele mode, and the object to be shot moves from an infinite distance to a near point, the second lens group will move toward the image side for focusing. A linear driver is employed to move the second lens group for executing the function of two-section zoom and continuous focus.

9 Claims, 4 Drawing Sheets

BIFOCAL DOUBLE GROUP LENS ASSEMBLY

BACKGROUND OF THE INVENTION

1. Field of the Invention

The present invention relates to a lens structure, and more particularly to a bifocal double group lens assembly with both zoom and focus functions, the first lens group is stationary, and the second lens group is driven by a linear driver.

2. Description of the Prior Art

Since image lens is used more and more widely in modern society, and particularly, image taking has been one of indispensable functions of the mobile phone product. However, the lens assembly in the product also needs to be miniaturized and thinned due to the requirement for portability. Therefore, within a set size, how to develop an image lens assembly with zoom and focus capability has become the focus of research of the advanced mobile phone's lens assembly.

Conventionally, a double group zoom lens needs a driver to drive the CAM barrel when zooming, so as to make the first lens group and the second lens group move synchronously. When focusing, the lens assembly needs another independent driver to drive the first lens group. Although this technique achieves the function of zooming and focusing, it still has the following disadvantages:

Firstly, this double group zoom lens requires two lens groups to move synchronously, and has too many moveable members, as a result, the reliability of the product is decreased.

Secondly, zooming and focusing operation of this double group zoom lens are executed separately by two independent drivers, therefore, the cost and the size of the lens assembly cannot be controlled effectively.

Thirdly, the zooming mechanism of this double group zoom lens usually consists of a CAM barrel and a driver, so its structure is complicated, mould cost is high, and size is large.

The present invention has arisen to mitigate and/or obviate the afore-described disadvantages.

SUMMARY OF THE INVENTION

The primary objective of the present invention is to provide a compact and low cost bifocal double group lens assembly.

To obtain the abovementioned objective, the bifocal double group lens assembly in accordance with the present invention, sequentially from the object side, comprises: a stationary first lens group with a negative refractive power, a second lens group with a positive refractive power being moveable along optical axis. The second lens group, at two different positions, can focus appropriately on an infinitely distant object when moving along the optical axis. A linear driver is employed to move the second lens group for executing the function of two-section zoom and continuous focus.

To reach the abovementioned goal, the bifocal double group lens assembly should have the following characteristics:

1. the first lens group with a negative refractive power can produce a virtual image of an infinitely distant object at the front focal point of the first lens group, and then the virtual image is projected onto the image plane by the second lens group. At this moment, the overall distance of the second lens group is $(A-f_1)$, the A is the position of the first lens group, here means the distance between the front surface of the first lens group and the image plane. $f_1$ is the focal length of the first lens group.

2. since the first lens is fixed and stationary, when the second lens is imaging at the overall distance $(A-f_1)$, the magnifications at the two positions are reciprocal to each other, they are $m_2$ and $1/m_2$. Suppose that the zoom ratio of the lens assembly is $X=(1/m_2)^2$, the focal length of the second lens group is $f_2$, the displacement of the second lens group is $\Delta d$, and the following relations can be obtained based on the paraxial imaging relation:

$$X=(1/m_2)^2$$

$$(d/f_2)=(X-1)/\text{sqrt}(X) \quad [1]$$

$$(A-f_1)/f_2=(1+X)/\text{sqrt}(X)+2 \quad [2]$$

3. since the first lens is stationary, in order to prevent the image the from changing too fast when switching between the two focal points, making the user feel uncomfortable, the zoom ratio X is controlled to be close to 2, at this moment:

$$(d/f_2)=0.7 \ (@X=2)$$

$$(A-f_1)/f_2=4.12 \ (@X=2)$$

the above relations are paraxial and might be slightly different from reality, therefore, the relations are set as follows:

$$0.5<(\Delta d/f_2)<0.9$$

$$4.0<[(A-f_1)/f_2]<4.6$$

then an ideal result can be obtained.

4. according to the relation (2), the total length of the optical system is essentially controlled by the second lens group, therefore, the focal length of the second lens group is set to be less than 6 mm, so that the total length of the optical system can be reduced to be smaller than 20 mm, namely, within the target scope of an ordinary miniaturized lens assembly.

5. when the second lens is imaging at the overall distance $(A-f_1)$, the magnifications at the two positions are reciprocal to each other, they are $m_2$ and $1/m_2$, it can be found that the average size of the virtual image produced by the first lens group must be approximately equal to the image size of the bifocal double group lens assembly. Therefore, the focal length of the first lens group should satisfy the following relation:

$$0.9<[(-f_1)/\sqrt{(f_{s1}*f_{s2})}]<1.1$$

wherein $f_{s1}$ and $f_{s2}$ are the focal lengths of the bifocal double group lens assembly in a wide angle mode and in a Tele mode.

6. When the object to be shot moves from far to near, the virtual image formed by the first lens group will move toward the image side. At this moment, the second lens group will move toward the central direction, that is to say that when the imaging system is in the wide angle mode, the second lens group is located close to the image side and moves toward the object side for focusing. When the imaging system is in the Tele mode, the second lens group is located close to the object side and moves toward the image side for focusing.

7. when the object to be shot moves too much toward the near side, the distance between the virtual image of the first lens group and the image plane might be changed to be within four times of the focal length of the second lens group, so that the focus function will be failed. At this moment, the focal length of the system should not be too long, therefore, $f_{s1}$ and $f_{s2}$ satisfy the following relation in order to ensure the focal function:

$(H/f_{s1}) > 0.52$ $(A/f_{s2}) < 2.0$ 8. since image height is fixed, when the focal length of the second lens group is shortened, the corresponding angle of view of the second lens group will increase, it needs more lens to make compensation for the aberration. But in reality, the second lens group is optimally consisted of 3-5 lenses. If the number of lenses is too large, the size of the second lens group will be excessively large, and the resultant length of the whole optical system will be increased. If the number lenses is too few, the aberration of the second lens group cannot be compensated.

DETAILED DESCRIPTION OF THE PREFERRED EMBODIMENTS

The present invention will be more clear from the following description when viewed together with the accompanying drawings, which show, for purpose of illustrations only, the preferred embodiment in accordance with the present invention.

Figure 1:
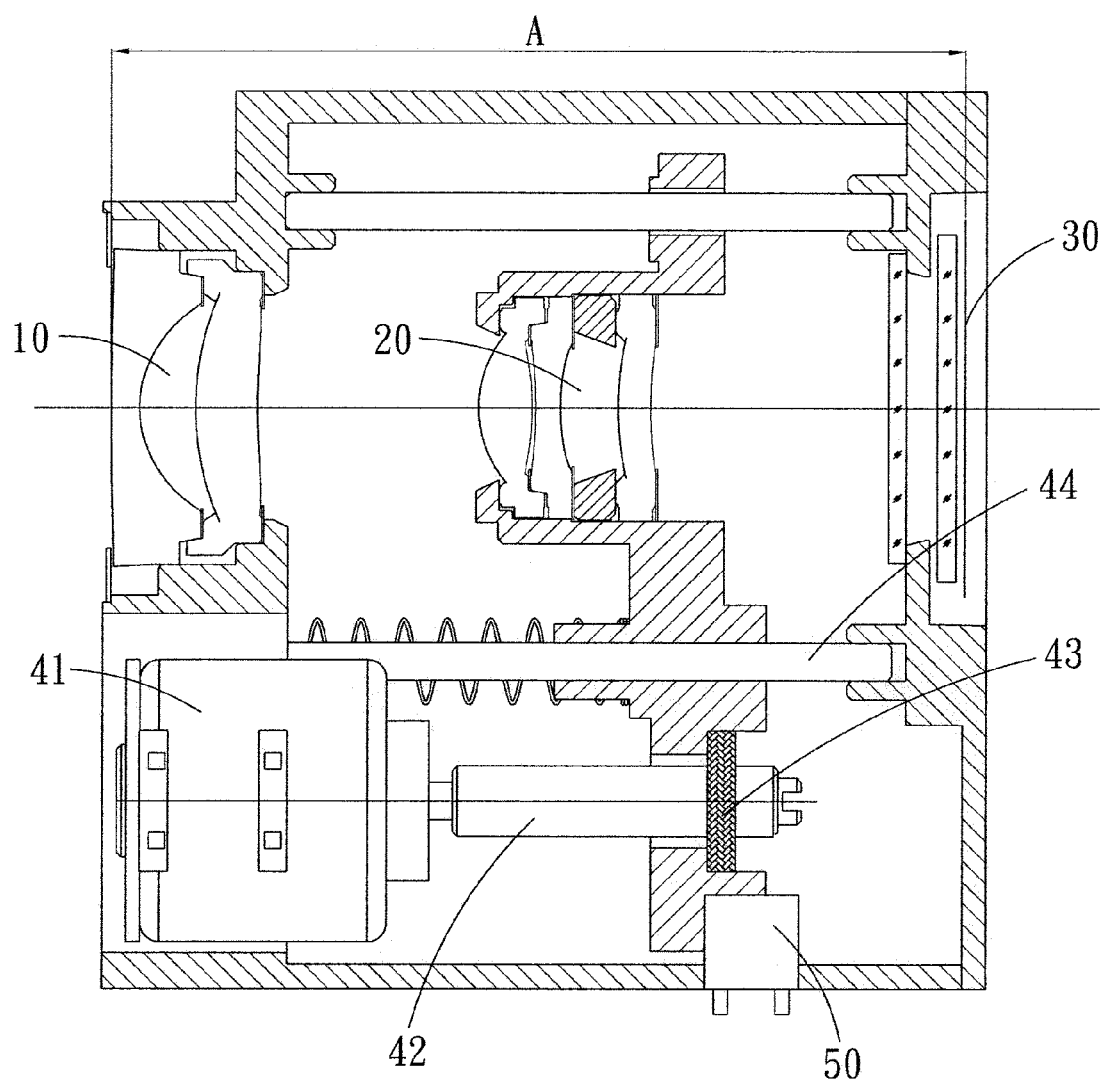
FIG. 1 is a cross sectional view in accordance with the present invention of showing a bifocal double group lens assembly being in a wide angle mode and a Tele mode.
Figure 2:
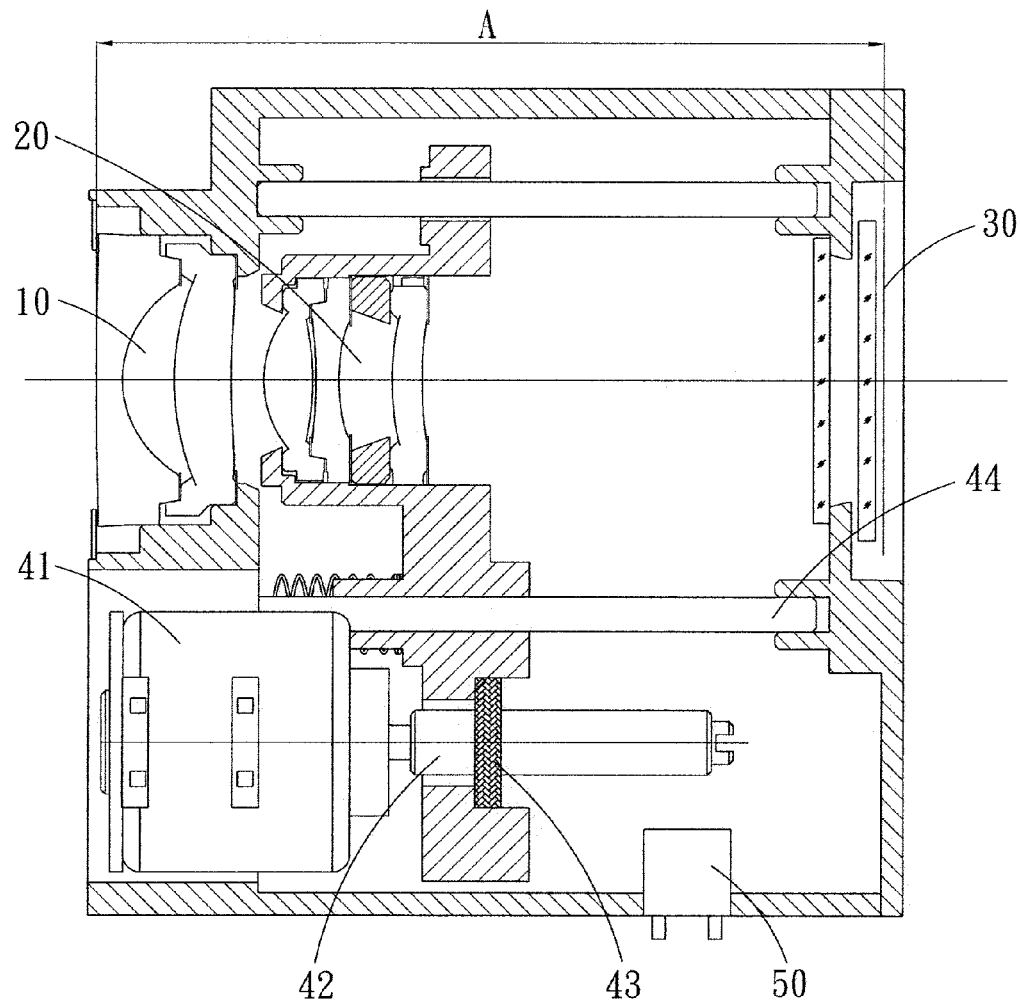
FIG. 2 is a cross sectional view in accordance with the present invention of showing the post-displacement status of the bifocal double group lens assembly that is in a wide angle mode and a Tele mode.
Figure 3:
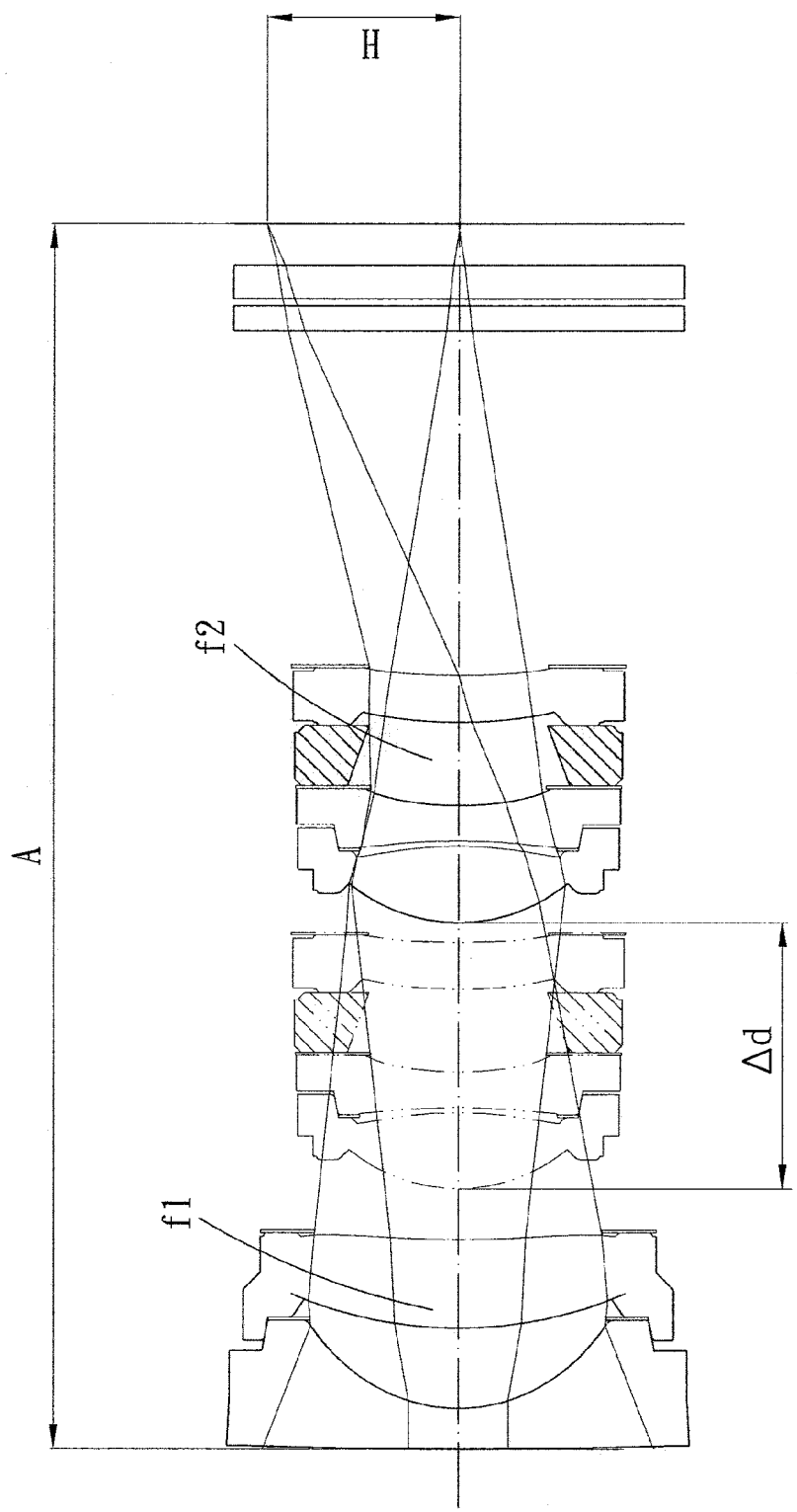
FIG. 3 is an illustrative view of showing the optical route the bifocal double group lens assembly of FIG. 1.
Figure 4:
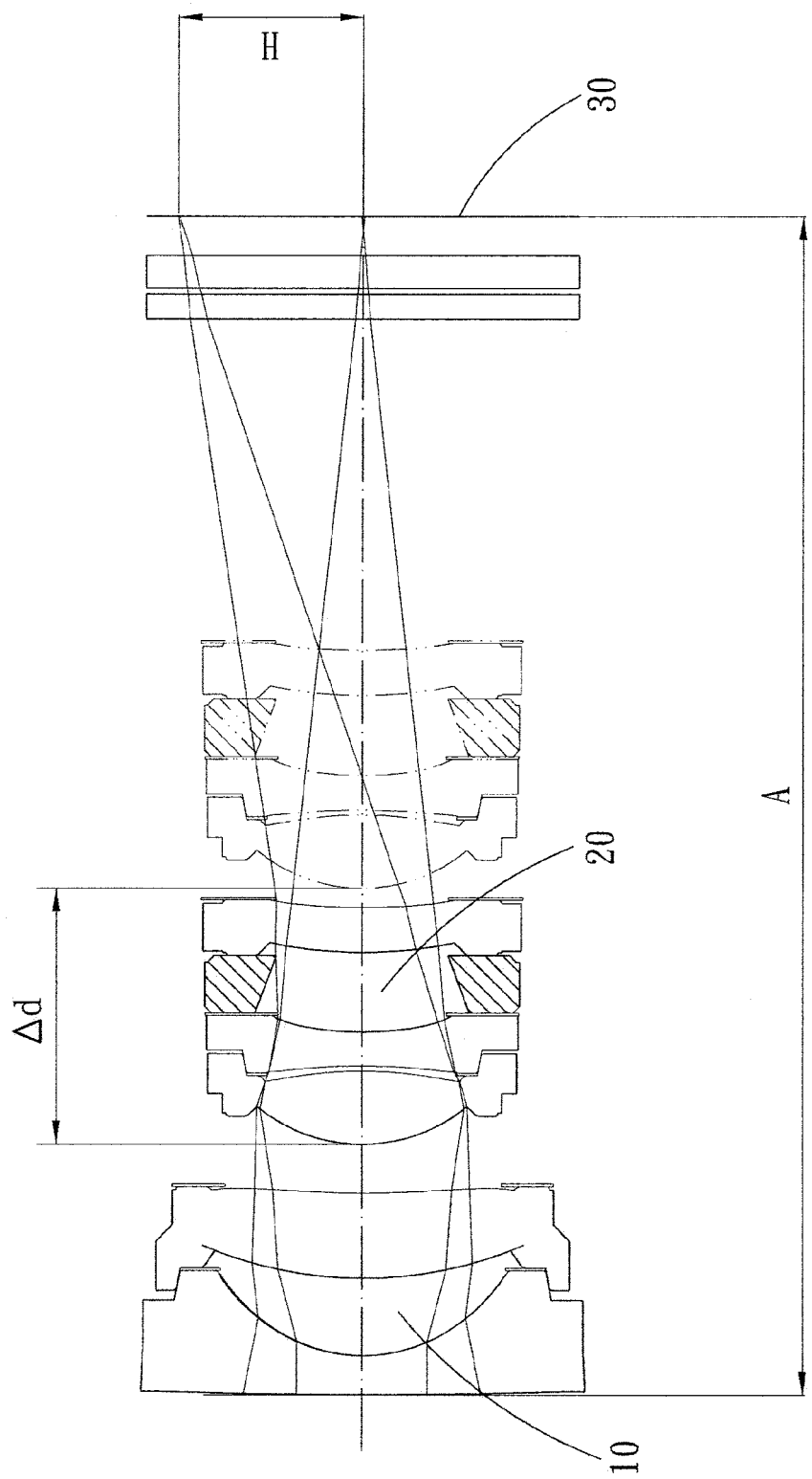
FIG. 4 is an illustrative view of showing the optical route the bifocal double group lens assembly of FIG. 2.

FIG. 4 shows a bifocal double group lens assembly in accordance with a first embodiment of the present invention, FIGS. 1 and 2 are illustrative views of showing the relative displacement between $f_{s1}$ and $f_{s2}$, and FIGS. 3 and 4 are illustrative view of showing the optical route of FIGS. 1 and 2.

The first embodiment as shown in FIG. 1 comprises: a first lens group 10, a second lens group 20, an image acquisition module 30, a step motor 41, a screw shaft 42, a nut 43, a guide rod 44, and a positioning sensor 50. The first lens group 10, the second lens group 20, and the image acquisition module 30 are arranged sequentially from the object side.

The first lens group 10 is stationary and is arranged at a fixed distance from the image acquisition module 30, and the first lens group 10 has a negative refractive power.

The second lens group 20 is moveable with respect to the first lens group 10 and along the optical axis. And, at two different positions, the second lens group 20 can focus appropriately on an infinitely distant object. The second lens group 20 has a positive refractive power and employs a linear driver to cooperate with the positioning sensor 50. The linear driver is consisted of the step motor 41, the screw shaft 42 and the nut 43, and the positioning sensor 50 is a photo interrupter.

The focal lengths $f_1$ and $f_2$ of the first and second lens groups 10 and 20 is $f_1$ (=−6.75 mm), $f_2$ (=5.52 mm). When the object is at an infinite distance, the focal length of the bifocal double group lens assembly in wide angle mode and in Tele mode are: $f_{s1}$(=4.71 mm), and $f_{s2}$(=9.38 mm). When the focal length changes from $f_{s1}$ to $f_{s2}$, the displacement of the second lens group is $\Delta d$ (=3.94 mm). The distance between the center of the front surface of the first lens group 10 and the image plane is A (=18.07 mm), and the image height of the lens assembly is: H (=2.82 mm). These variables satisfy the following relations:

$f_2 < 6.0$ mm (1)

$0.5 < (\Delta d/f_2) < 0.9$ (2)

$4.0 < [(A-f_1)/f_2] < 4.6$ (3)

$0.9 < [(-f_1)/\sqrt{(f_{s1}*f_{s2})}] < 1.1$ (4)

$(H/f_{s1}) > 0.52$ (5)

$(A/f_{s2}) < 2.0$ (6)

The distance A between the center of the front surface of the first lens group 10 and the image plane needs to be short, based on the relation (3), the focal length $f_2$ of the second lens group has to be short and the second lens group should have a comparatively great refractive power, the resultant aberration will be increased, and it needs more lenses to provide compensation, that's why the second lens group is made up of three lenses.

This embodiment employs only one linear driver to move the second lens group 20 along the optical axis and between the two focal points, and these two focal points correspond to the wide angle and the Tele modes. When the lens assembly is in the wide angle mode, and the object to be shot moves from an infinite distance to a near point, the second lens group will move toward the object side for focusing. When the lens assembly is in the Tele mode, and the object to be shot moves from an infinite distance to a near point, the second lens group will move toward the image side for focusing. Therefore, the second lens group 20 of this embodiment is both a zoom assembly and a focus assembly.

By utilizing the conditions of the two positions of the second lens group, the present invention only needs one linear driver to execute the zoom in/out and focus function. Therefore, the lens assembly of the present invention is not only low in cost, but also is small in size.

While we have shown and described various embodiments in accordance with the present invention, it is clear to those skilled in the art that further embodiments may be made without departing from the scope of the present invention.

What is claimed is:

1. A bifocal double group lens assembly, sequentially from the object side, comprising: a stationary first lens group with a negative refractive power, a second lens group with a positive refractive power being moveable along optical axis; characterized in that:

the second lens group is focused properly at two positions when moving along the optical axis, and satisfies the following relations:

$f_2 < 6.0$ mm $0.5 < (\Delta d/f_2) < 0.9$ wherein: $f_2$ is a focal length of the second lens group Δd is a distance between two image positions of the second lens group.

2. The bifocal double group lens assembly as claimed in claim 1, wherein the number of the lenses of the second lens group is equal to or greater than three.

3. The bifocal double group lens assembly as claimed in claim 2, wherein the number of the lenses of the second lens group is equal to or less than five.

4. The bifocal double group lens assembly as claimed in claim 1, wherein a distance between a center of a front surface of the first lens group and an image plane is A, a focal length of the first lens group is $f_1$, and the focal length of the second lens group is $f_2$, they satisfy the following relation:

$$4.0 < [(A-f_1)/f_2] < 4.6.$$

5. The bifocal double group lens assembly as claimed in claim 4, wherein the focal length of the first lens group is $f_1$ and the focal length of the second lens group is $f_2$ when the second lens group is located at two appropriate image positions, they satisfy the following relation:

$$0.9 < [(-f_1)/\sqrt{(f_{s1} * f_{s2})}] < 1.1.$$

6. The bifocal double group lens assembly as claimed in claim 5, wherein a image height of the bifocal double group lens assembly is H, a distance between a center of a front surface of the first lens group and an image plane is A, a focal length of the bifocal double group lens assembly when the second lens group is located close to the first lens group are: $f_{s2}$, and they satisfy the following relations:

$$(H/f_{s1}) > 0.52$$

$$(A/f_{s2}) < 2.0.$$

7. The bifocal double group lens assembly as claimed in claim 1, wherein the second lens group is driven to move by a linear driver and is guided by a guide rod to move along the optical axis.

8. The bifocal double group lens assembly as claimed in claim 7, wherein the linear driver includes a step motor, a screw shaft, and a nut.

9. The bifocal double group lens assembly as claimed in claim 1, wherein two positions correspond to wide angle mode and Tele mode, when the bifocal double group lens assembly is in the wide angle mode, and an object to be shot moves from an infinite distance to a near point, the second lens group will move toward the object side for focusing, when the bifocal double group lens assembly is in the Tele mode, and the object to be shot moves from an infinite distance to a near point, the second lens group will move toward the image side for focusing.

* * * * *